United States Patent [19]
Yoshikawa et al.

[11] Patent Number: 6,144,155
[45] Date of Patent: *Nov. 7, 2000

[54] ELECTRON EMISSION DEVICE AND DISPLAY DEVICE USING THE SAME

[75] Inventors: Takamasa Yoshikawa; Takashi Chuman; Nobuyasu Negishi; Shingo Iwasaki; Kiyohide Ogasawara; Hiroshi Ito, all of Tsurugashima, Japan

[73] Assignee: Pioneer Electronic Corporation, Tokyo, Japan

[*] Notice: This patent is subject to a terminal disclaimer.

[21] Appl. No.: 09/078,133

[22] Filed: May 14, 1998

[30] Foreign Application Priority Data

May 15, 1997 [JP] Japan ................................. 9-125957

[51] Int. Cl.$^7$ ......................................................... H01J 1/02
[52] U.S. Cl. ............................ 313/495; 313/497; 313/308
[58] Field of Search .................................... 313/306, 308, 313/309, 336, 351, 495, 497, 310, 506, 509, 496

[56] References Cited

U.S. PATENT DOCUMENTS 3,447,045  5/1969  Hickmott .
5,962,959  10/1999  Iwasaki et al. ........................ 313/495

FOREIGN PATENT DOCUMENTS 7-65710  3/1995  Japan .

*Primary Examiner*—Ashok Patel
*Attorney, Agent, or Firm*—Morgan, Lewis & Bockius LLP

[57] ABSTRACT

An electron emission device exhibits a high electron emission efficiency. The device includes an electron supply layer of metal or semiconductor, an insulator layer formed on the electron supply layer, and a thin-film metal electrode formed on the insulator layer. The insulator layer is formed by oxidation or nitriding process of the electron supply layer and has a film thickness of 50 nm or greater. When an electric field is applied between the electron supply layer and the thin-film metal electrode, the electron emission device emits electrons.

4 Claims, 6 Drawing Sheets

ENERGY BAND

ELECTRON EMISSION DEVICE AND DISPLAY DEVICE USING THE SAME

BACKGROUND OF THE INVENTION

1. Field of the Invention

The present invention relates to an electron emission device and an electron emission display device using the same.

2. Description of the Related Art

In field electron emission display apparatuses, a Field Emission Display (FED) is known as a planar emission display device equipped with an array of cold-cathode electron emission source which does not require cathode heating. The emission principle of, for example, an FED using a spindt type cold cathode is as follows: Its emission principle is like a CRT (Cathode Ray Tube), although this FED has a cathode array different from that of CRT, that is, electrons are drawn into a vacuum space by means of a gate electrode spaced apart from the cathode, and the electrons are made to impinge upon the fluorescent substance that is coated on a transparent anode, thereby causing light emission.

This field emission source, however, faces a problem of low production yield because the manufacture of the minute spindt type cold cathode is complex and involves many steps.

There also exists an electron emission device with a metal-insulator-metal (MIM) structure as a planar electron source. The electron emission device with the MIM structure has an Al layer as a cathode, an $Al_2O_3$ insulator layer of about 10 nm in film thickness and an Au layer, as an anode, of about 10 nm in film thickness formed in order on the substrate. With this device placed under an opposing electrode in a vacuum, when a voltage is applied between the underlying Al layer and the overlying Au layer and an acceleration voltage is applied to the opposing electrode, some of electrons leap out of the overlying Au layer and reach the opposing electrode. Even the electron emission device with the MIM structure does not yet provide a sufficient amount of emitted electrons.

To improve this property of emission, it is considered that there is a necessity to make the $Al_2O_3$ insulator layer thinner by about several nanometers and make the quality of the membranous of the $Al_2O_3$ insulator layer and the interface between the $Al_2O_3$ insulator layer and the overlying Au layer more uniform.

To provide a thinner and more uniform insulator layer, for example, an attempt has been made to control the formation current by using an anodization thereby to improve the electron emission characteristic, as in the invention described in Japanese Patent Application kokai No. Hei 7-65710.

However, even an electron emission device with the MIM structure which is manufactured by this method ensures an emission current of about $1 \times 10^{-6}$ A/cm$^2$ and an electron emission efficiency of about $1 \times 10^{-3}$.

OBJECT AND SUMMARY OF THE INVENTION

Accordingly, it is an object of the present invention to provide an electron emission device with a high electron emission efficiency and an electron emission display apparatus using the same.

The foregoing and other problems are overcome and the object of the invention are realized by an electron emission device in accordance with embodiments of this invention, wherein the device according to the invention comprises:

an electron supply layer made of metal or semiconductor;

an insulator layer formed on the electron supply layer; and a thin-film metal electrode formed on the insulator layer and facing a vacuum space, characterized in that said insulator layer formed by oxidation or nitriding process of said electron supply layer and having at a film thickness of 50 nm or greater, whereby the electron emission device emits electrons when an electric field is applied between the electron supply layer and the thin-film metal.

In the electron emission device according to the invention, said electron supply layer is made of silicon; and said insulator layer made a substance selected form silicon oxide and silicon nitride.

According to the electron emission device of the invention with the above structure, through-bores are not likely to be produced in the insulator layer because of its large thickness and then the production yield is improved. The emission current of the electron emission device is greater than $1 \times 10^{-6}$ A/cm$^2$ and is approximately $1 \times 10^{-3}$ A/cm$^2$, and the electron emission efficiency obtained is $1 \times 10^{-1}$. Therefore, this electron emission device, when in use in a display device, can provide a high luminance, can suppress the consumption of the drive current and the generation of heat from the device, and can reduce a burden on the driving circuit.

The electron emission device of the invention is a planar or spot-like electron emission diode and can be adapted to high speed devices such as a source of a pixel vacuum tube or bulb, an electromagnetic emission source of an electron microscope, a vacuum-micro electronics device and the like. In addition, this electron emission device can serve as a light-emitting diode or a laser diode which emits electromagnetic waves of infrared rays, visible light or ultraviolet rays.

Moreover a display device using an electron emission device according to the invention comprises:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor; an insulator layer formed on the electron supply layer; and a thin-film metal electrode formed on the insulator layer and facing a vacuum space, wherein said insulator layer formed by oxidation or nitriding process of said electron supply layer and having at a film thickness of 50 nm or greater.

DETAILED DESCRIPTION OF THE PREFERRED EMBODIMENTS

Preferred embodiments according to the present invention will be described in more detail with reference to the accompanying drawings.

Figure 1:
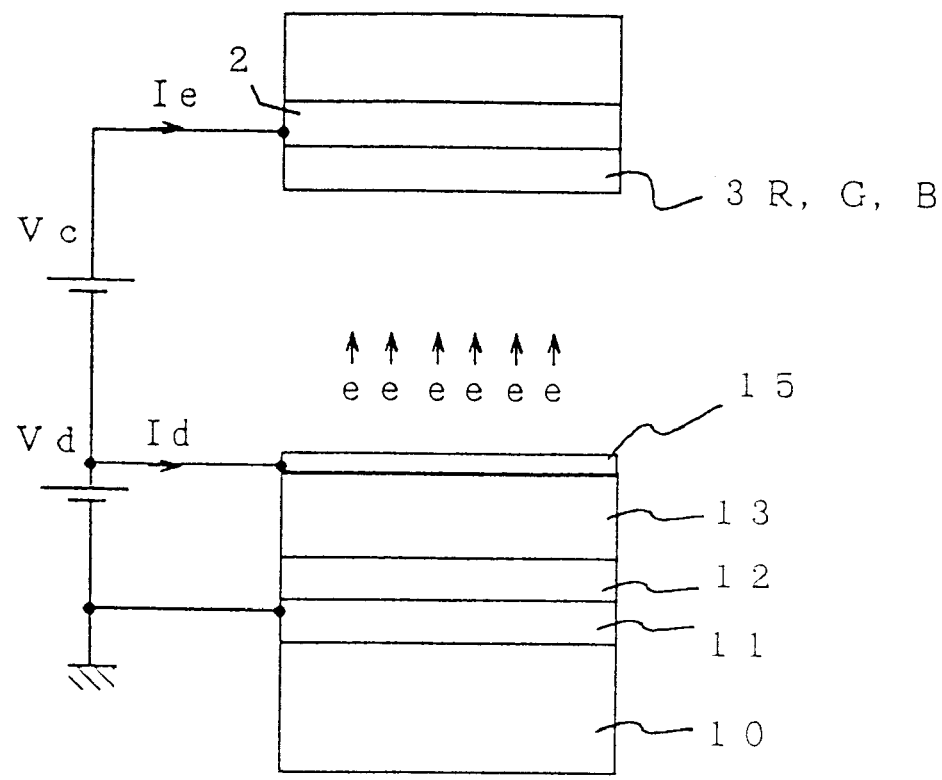
FIG. 1 is a schematic cross-sectional view of an electron emission device according to the invention.

As shown in FIG. 1, an electron emission device embodying the invention has an ohmic electrode 11 formed on a device substrate 10. The electron emission device further has an electron supply layer 12 of metal or semiconductor, an insulator layer 13 and a thin-film metal electrode 15 of metal facing a vacuum space which are layered or formed in turn on the ohmic electrode. The electron emission device emits electrons when an electric field is applied between the electron supply layer and the thin-film metal electrode. The insulator layer 13 is formed through an oxidation or nitriding process of the electron supply layer and having at a film thickness of 50 nm or greater.

This electron emission device can be regarded as a diode of which the thin-film metal electrode 15 at its surface is connected to a positive potential Vd and the back i.e., ohmic electrode 11 is connected to a ground potential. When the voltage Vd is applied between the ohmic electrode 11 and the thin-film metal electrode 15 to supply electrons into the electron supply layer 12, a diode current Id flows. Since the insulator layer 13 has a high resistance, most of the applied electric field is applied to the insulator layer 13. The electrons travel inside the insulator layer 13 toward the thin-film metal electrode 15. Some of the electrons that reach near the thin-film metal electrode 15 tunnel through the thin-film metal electrode 15, due to the strong field, to be discharged out into the vacuum space. The electrons e (emission current Ie) discharged from the thin-film metal electrode 15 by the tunnel effect are accelerated by a high voltage Vc, which is applied to an opposing collector electrode (transparent electrode) 2, and is collected at the collector electrode 2. If a fluorescent substance is coated on the collector electrode 2, corresponding visible light is emitted.

Although sputtering is particularly effective in forming those layers on the substrate except the insulator layer 13, other methods such as the vacuum deposition, the CVD (Chemical Vapor Deposition), the laser ablation, the MBE (Molecular Beam Epitaxy) and the ion beam sputtering are also effective to the formation of those layers.

Figure 2:
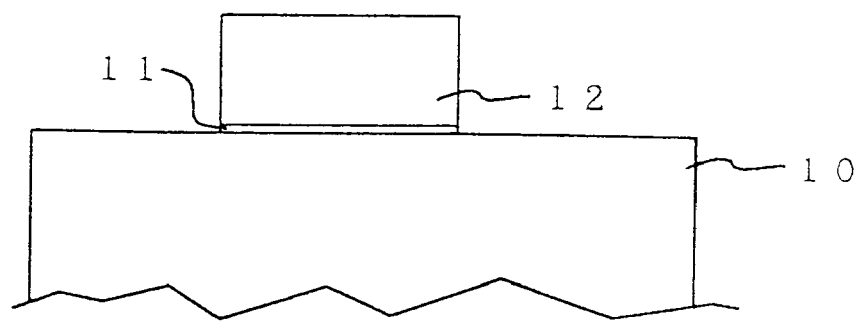
FIGS. 2 to 4 are partly enlarged schematic cross-sectional views each showing a substrate with functional layers for the manufacture of an electron emission device according to the invention.

The formation of the insulator layer 13 by the oxidation or nitriding process of the electron supply layer is performed as follows: As shown in FIG. 2, the electron supply layer 12 of Si is firstly deposited on the ohmic electrode 11 formed on the substrate 10 through the sputtering. The sputtering method may be performed by using a gas of Ar, Kr or Xe or a mixture thereof, or a gas mixture essentially consisting of one of those rare gases with $O_2$, $N_2$, $H_2$ or the like mixed therein, under the sputtering conditions of a gas pressure of 0.1 to 100 mTorr, preferably 0.1 to 20 mTorr and the forming rate i.e., deposition rate of 0.1 to 1000 nm/min, preferably 0.5 to 100 nm/min. The single layer or multilayer structure, the amorphous phase, the grain size and the atomic ratio of each layer for the electron supply layer and the insulator layer are able to be controlled by properly altering the sputtering target and sputtering conditions of the sputtering device.

Figure 3:
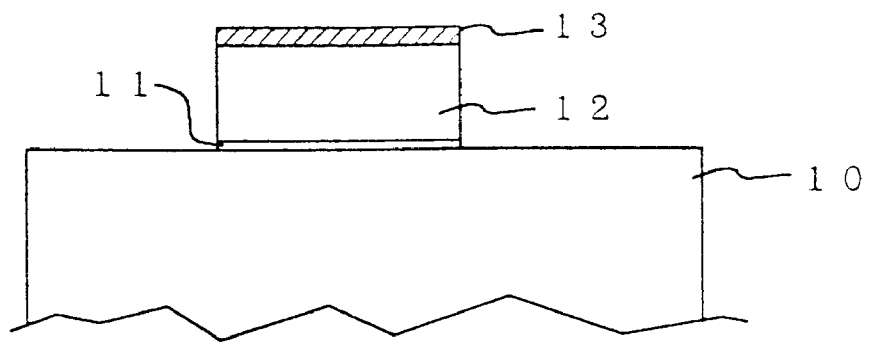

Next, as shown in FIG. 3, the electron supply layer 12 is exposed under a gaseous or plasma atmosphere of oxygen so as to be oxidized. The oxidizing conditions is for example of a temperature ranging from 700 to 1200 degrees Centigrade and a time period of from 1 to 120 minutes in oxygen gas, alternatively under of a temperature ranging from 100 to 900 degrees Centigrade and a time period of form 1 to 120 minutes in the oxygen plasma. Alternatively, as shown in FIG. 3, the electron supply layer 12 may be exposed under a gaseous or plasma atmosphere of nitrogen so as to be nitrified. The porous semiconductor layer may be nitrided under the nitriding conditions of a temperature ranging from 700 to 1200 degrees Centigrade and a time period of form 1 to 120 minutes in nitrogen gas, alternatively under the nitriding conditions of a temperature ranging from 100 to 900 degrees Centigrade and a time period of form 1 to 120 minutes in nitrogen plasma. In this way, by gaseous phase oxidizing or nitriding, each insulator layer 13 is formed within the electron supply layer 12 while changed its thickness in ranging from 50 to 700 nm.

The actual analysis on the $SiO_2$ insulator layer 13 in this embodiment by using an X-ray diffraction has been performed and then the result showed mainly a halo intensity Ia caused by the amorphous phase. It can be assumed from this result that $SiO_2$ of the insulator layer having an amorphous phase.

Figure 4:
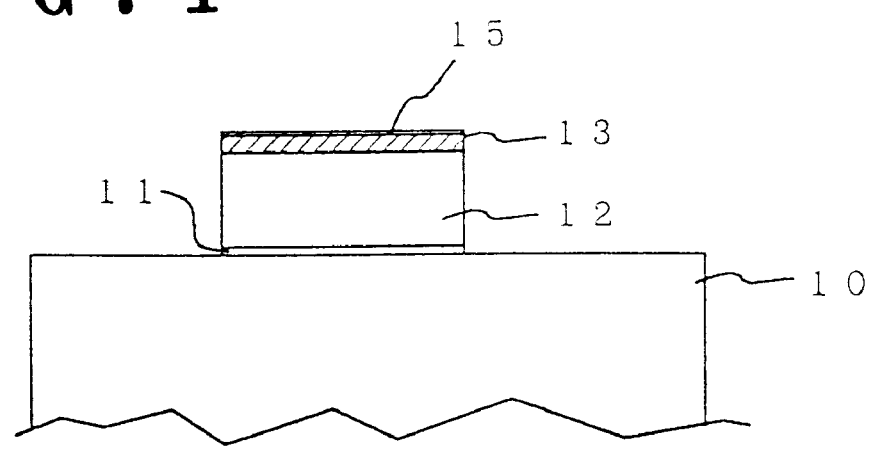

Next, as shown in FIG. 4 the thin-film metal electrode 15 of Au is deposited on the insulator layer 13.

While Si is particularly effective as a material for the electron supply layer 12 of the electron emission device, an elemental semiconductor or a compound semiconductor of an element of a group IV, a group III-V, a group II-VI or the like, such as a germanium (Ge), silicon carbide (SiC), gallium arsenide (GaAs), indium phosphide (InP), or cadmium selenide (CdSe) can be used as well.

While metals for the electron supply layer 12 such as Al, Au, Ag and Cu are effective as the electron supplying material, Sc, Ti, V, Cr, Mn, Fe, Co, Ni, Zn, Ga, Y, Zr, Nb, Mo, Tc, Ru, Rh, Pd, Cd, Ln, Sn, Ta, W, Re, Os, Ir, Pt, Tl, Pb, La, Ce, Pr, Nd, Pm, Sm, Eu, Gd, Tb, Dy, Ho, Er, Tm, Yb, Lu, and the like can be used as well.

The preferred combinations of materials of the electron supply layer and insulator layer containing the same chemical elements in both are listed as examples as follows:

Electron supply layer—Insulator layer

Li—$LiO_x$, $LiAlO_2$, $Li_2SiO_3$, $Li_2TiO_3$, $LiN_x$

Na—$NaO_x$, $Na_2Al_{22}O_{34}$, $NaFeO_2$, $Na_4SiO_4$

K—$KO_x$, $K_2SiO_3$, $K_2TiO_3$, $K_2WO_4$

Rb—$RbO_x$, $Rb_2CrO_4$

Cs—$CsO_x$, $Cs_2CrO_4$

Be—$BeO_x$

Mg—$MgO_x$, $MgAl_2O_4$, $MgFe_2O_4$, $MgTiO_3$, $MgN_x$

Ca—$CaO_x$, $CaTiO_3$, $CaWO_4$, $CaZrO_3$, $CaN_x$, $CaC_2$

Sr—$SrO_x$, $SrFe_{12}O_{19}$, $SrTiO_3$, $SrZrO_3$

Ba—$BaO_x$, $BaA_{12}O_4$, $BaFe_{12}O_{19}$, $BaTiO_3$, $Ba_4C$

Sc—$SCO_x$

Y—$YO_x$, $Y_3Al_5O_{12}$, $Y_3Fe_5O_{12}$, $YN_x$

La—LaO$_x$, LaFeO$_3$, La$_3$Fe$_5$O$_{12}$, La$_2$Ti$_2$O$_7$, LaN$_x$
Ce—CeO$_x$, CeSnO$_4$, CeTiO$_4$
Pr—PrO$_x$
Nd—NdO$_x$
Sm—SmO$_x$, Sm$_3$Fe$_5$O$_{12}$
Eu—EuO$_x$, EuFeO$_3$, Eu$_3$Fe$_5$O$_{12}$
Gd—GdO$_x$, GdFeO$_3$, Gd3Fe$_5$O$_{12}$
Tb—TbO$_x$,
Dy—DyO$_x$, DyFeO$_3$, Dy$_3$Fe$_5$O$_{12}$
Ho—HoO$_x$, HoFeO$_3$, Ho$_3$Fe$_5$O$_{12}$
Er—ErO$_x$, ErFeO$_3$, Er$_3$Fe$_5$O$_{12}$
Tm—TmO$_x$, Tm$_3$Fe$_5$O$_{12}$
Yb—YbO$_x$
Lu—LuO$_x$, LuFeO$_3$, Lu$_3$Fe$_5$O$_{12}$
Ti—TiO$_x$, NiTiO$_3$, Al$_2$TiO$_3$, FeTiO$_3$, TiN$_x$, TiC
Zr—ZrO$_x$, BaZrO$_3$, LiZrO$_3$, MgZrO$_3$, ZrN$_x$, ZrC
Hf—HfO$_x$, HfTiO$_4$, HfN$_x$, HfC
Th—ThO$_x$, ThC
V—VO$_x$, NH$_4$VO$_3$, AgVO$_3$, LiVO$_3$, VN$_x$, VC
Nb—NbO$_x$, BaNb$_2$O$_6$, NaNbO$_3$, SrNb$_2$O$_6$, NbN$_x$, NbC
Ta—TaO$_x$, KTaO$_3$, NaTaO$_3$, SrTa$_2$O$_6$, TaN$_x$, TaC
Cr—CrO$_x$, CuCr$_2$O$_4$, Ag$_2$CrO$_4$, CrN$_x$, Cr$_3$C$_2$
Mo—MoO$_x$, k$_2$MoO$_4$, Na$_2$MoO$_4$, NiMoO$_4$, MoN$_x$, Mo$_2$C, MOC
W—WO$_x$, BaWO$_4$, Na$_2$WO$_4$, SrWO$_4$, WN$_x$, W$_2$C, WC
Mn—MnO$_x$, MnCr$_2$O$_4$, MnFe$_2$O$_4$, MnTiO$_3$, MnWO$_4$
Re—ReO$_x$
Fe—FeO$_x$, CoFe$_2$O$_4$, ZnFe$_2$O$_4$, FeWO$_4$, FeN$_x$
Ru—RuO$_x$
Os—OSO$_x$
Co—CoO$_x$, CoMoO$_4$, CoTiO$_3$, CoWO$_4$
Rh—RhO$_x$
Ir—IrO$_x$
Ni—NiO$_x$, NiFe$_2$O$_4$, NiWO$_4$
Pd—PdO$_x$
Pt—PtO$_x$
Cu—CuO$_x$, CuFe$_2$O$_4$, CuMoO$_4$, CuTiO$_3$, CuWO$_4$, CuN$_x$
Ag—AgO$_x$, Ag$_2$MoO$_4$, Ag$_2$WO$_4$
Au—AuO$_x$
Zn—ZnO$_x$, ZnAl$_2$O$_4$, ZnMoO$_4$, ZnWO$_4$
Cd—CdO$_x$, CdSnO$_3$, CdTiO$_3$, CdMoO$_4$, CdWO$_4$
Hg—HgO$_x$
B—BO$_x$, BN$_x$
Al—AlO$_x$, NaAl$_2$, MgAl$_2$O$_4$, SrAl$_2$O$_4$, AlN$_x$, SiAlO$_4$, Al$_4$C$_3$
Ga—GaO$_x$, Gd$_3$Ga$_5$O$_{12}$, GaN$_x$
In—InO$_x$, InFeO$_3$, MgIn$_2$O$_4$,
Ti—TiO$_x$, Al$_2$TiO$_3$, FeTiO$_3$, MgTiO$_3$, TiN$_x$
Si—SiO$_x$, Na$_2$SiO$_5$, CaSiO$_3$, ZrSiO$_4$, SiN$_x$, SiAlON, SiC
Ge—GeO$_x$, K$_2$GeO$_3$, Li$_2$GeO$_3$, Na$_2$GeO$_3$, GeC
Sn—SnO$_x$, Bi$_2$Sn$_3$O$_9$, MgSnO$_3$, SrSnO$_3$
Pd—PbO$_x$, PbSiO$_3$, PbMoO$_4$, PdTiO$_3$
P—PO$_x$, PN$_x$
As—AsO$_x$
Sb—SbO$_x$, SnO$_2$—Sb$_2$O$_3$
Se—SeO$_x$, CuSeO$_4$, Na$_2$SeO$_3$, ZnSeO$_3$
Te—TeO$_x$, K$_2$TeO$_3$, K$_2$TeO$_4$, Na$_2$TeO$_3$, Na$_2$TeO$_4$

In this case, when the material for the electron supply layer is selected from the left side of list, at least one oxide or nitride material is selected from the corresponding material of the right side for the insulator layer. The subscribed x in O$_x$, N$_x$, and the like in the above chemical formulas represent atomic ratios and also herein after.

Metals Pt, Au, W, Ru and Ir are effective as the material for the thin-film metal electrode 15 on the electron emission side. In addition, Al, Sc, Ti, V, Cr, Mn, Fe, Co, Ni, Cu, Zn, Ga, Y, Zr, Nb, Mo, Tc, Rh, Pd, Ag, Cd, Ln, Sn, Ta, Re, Os, Tl, Pb, La, Ce, Pr, Nd, Pm, Sm, Eu, Gd, Tb, Dy, Ho, Er, Tm, Yb, Lu and the like can be used as well for the thin-film metal electrode.

Ceramics such as Al$_2$O$_3$, Si$_3$N$_4$ and BN etc., or a Si wafer surface-oxidized may be used for the material of the device substrate 10 instead of glass.

EXAMPLES

Electron emission devices according to the invention were fabricated and their characteristics were examined concretely.

An electron supply layer of silicon (Si) was formed at 5000 nm thick, by sputtering, on an electrode surface of a device substrate 10 of glass on which an ohmic electrode of W was previously formed 300 nm thick by sputtering. A plurality of Si substrates of this type were prepared.

Then, insulator layers of SiOX were formed on the electron supply layers of the Si substrates by the gaseous phase oxidation under the conditions of a temperature ranging from 700 to 1200 degrees Centigrade and a time period of from 1 to 120 minutes in oxygen gas respectively while changing the film thickness thereof in a range from 0 nm to 700 nm. Thus a plurality of SiO$_x$-insulator substrates were provided.

Finally, a thin-film metal electrode of Pt was formed at a 10 nm thick on the surface of the amorphous SiO$_x$ layer of each substrate by sputtering, thus providing plural device substrates.

Meanwhile, transparent substrates were prepared, each of which has an ITO collector electrode formed inside a transparent glass substrate and has a fluorescent layer of a fluorescent substance corresponding to R, G or B color emission formed on the collector electrode by the normal scheme.

Electron emission devices were assembled in each of which the device substrate and the transparent substrate are supported apart from one another by 10 mm in parallel by a spacer in such way that the thin-film metal electrode 15 faced the collector electrode 2, with the clearance therebetween made to a vacuum of $10^{-7}$ Torr or $10^{-5}$ Pa.

Then, the diode current Id and the emission current Ie corresponding to the thickness of the SiO$_x$ film of each of the acquired plural devices were measured.

Figure 5:
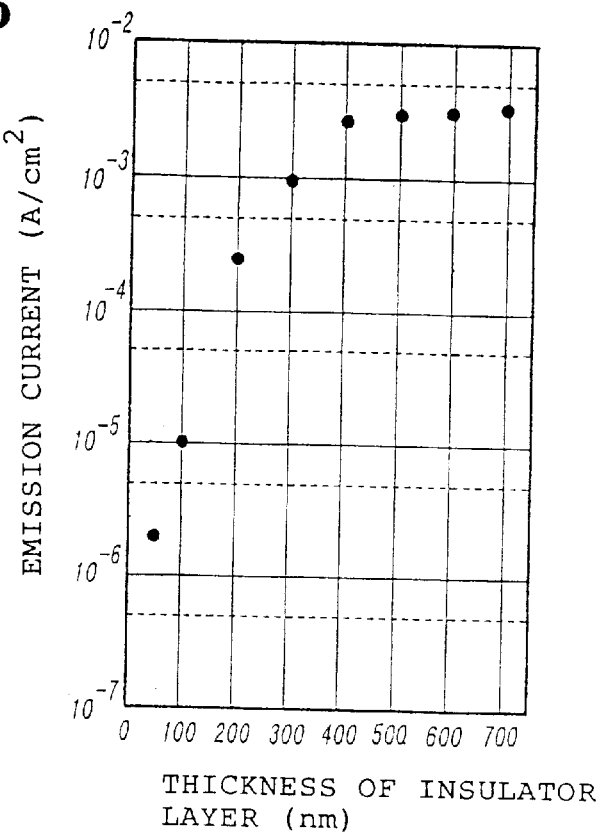
FIG. 5 is a graph showing a dependency of the electron emission current on the film thickness of an insulator layer in the electron emission device embodying the invention.
Figure 6:
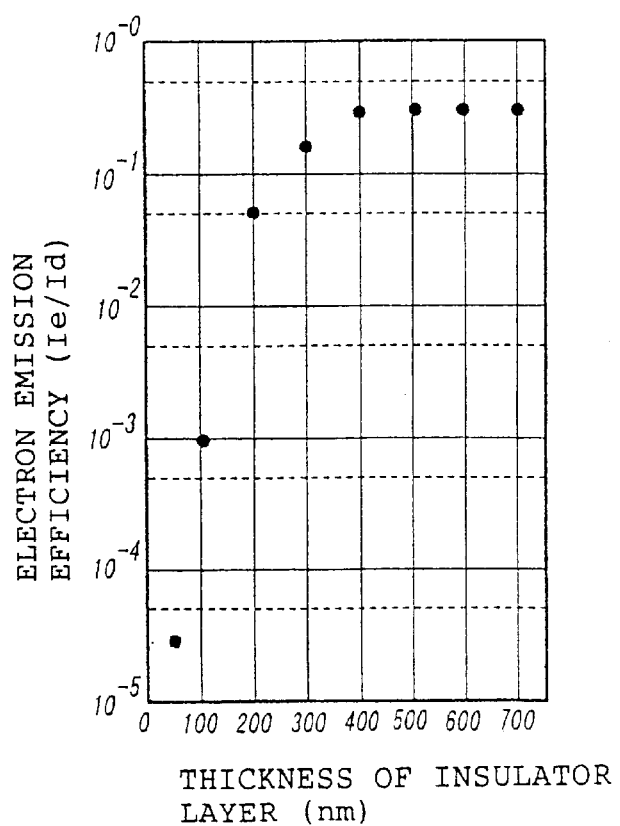
FIG. 6 is a graph showing a dependency of the electron emission efficiency on the film thickness of the insulator layer in the electron emission device embodying the invention.

FIGS. 5 and 6 show the relationships between the film thickness of each SiO$_x$ layer and the maximum emission current Ie, and between the film thickness and the maximum electron emission efficiency (Ie/Id) for each film thickness respectively when a driving voltage Vd of 0 to 200 V was applied to the prepared electron emission devices. As apparent from FIGS. 5 and 6, while the enough emission current and the electron emission efficiency were saturated from the thickness of 50 nm, the devices whose SiO$_x$ layers having thicknesses of 300 to 400 nm showed the maximum emission current of about $1 \times 10^{-3}$ A/cm$^2$ and the maximum electron emission efficiency of about $1 \times 10^{-1}$.

It is understood from those results that by applying a voltage of 200 V or lower, the emission current of $1 \times 10^{-6}$ A/cm$^2$ or greater and the electron emission efficiency of $1 \times 10^{-3}$ or greater can be acquired from an electron emission device which has an SiO$_x$ dielectric layer 50 nm or greater in thickness, preferably 100 to 400 nm in thickness.

With a voltage of approximately 4 kV applied between the fluorescent-substance coated collector electrode and the thin-film metal electrode, a uniform fluorescent pattern corresponding to the shape of the thin-film metal electrode was observed in the devices whose SiO$_2$ layers have thicknesses of 50 nm or greater. This shows that the electron emission from the amorphous $SiO_x$ layer is uniform and has a high linearity, and that those devices can serve as an electron emission diode, or a light-emitting diode or laser diode which emits electromagnetic waves of infrared rays, visible light or ultraviolet rays.

Figure 10:
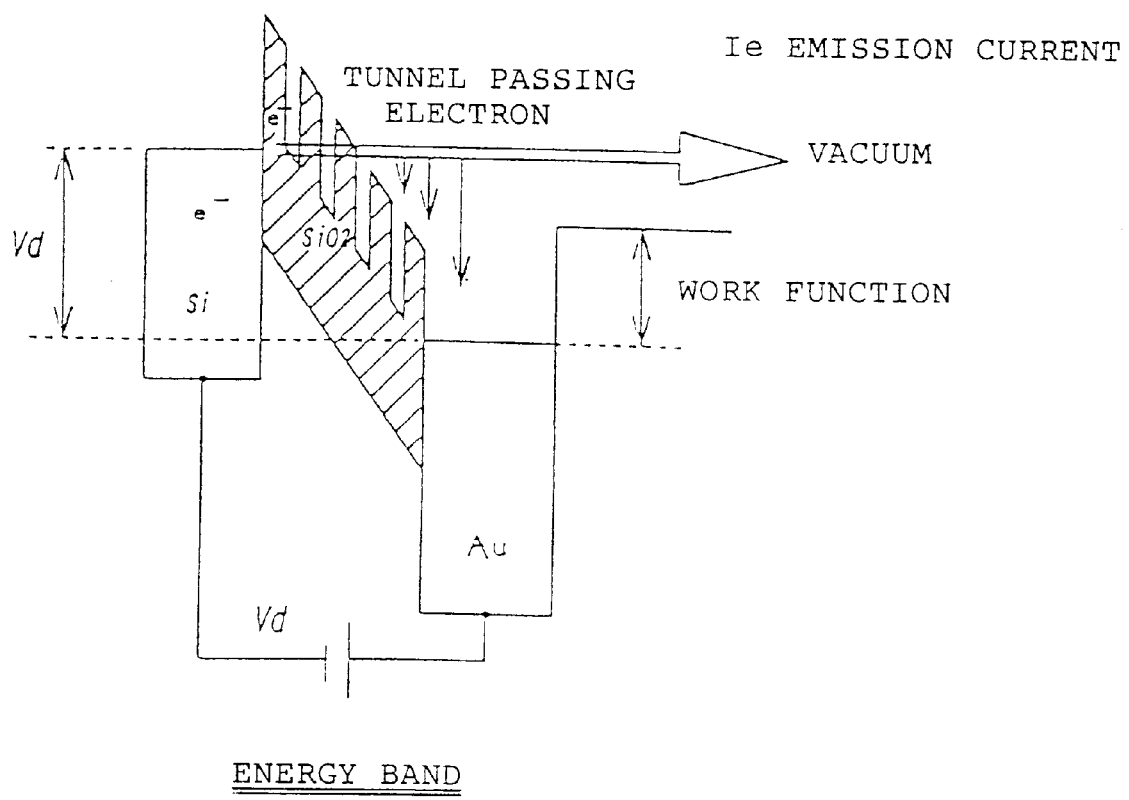
FIG. 10 is a diagram for explaining the operation of the electron emission device of the invention.

There were observations of the surface of the $SiO_x$ insulator layer resulted form the oxidation of the electron supply layer by a scanning electron microscope (SEM) during the above formation process, grain surface each having an about 20 nm diameter appeared. The grain structure of $SiO_x$ of the insulator layer seems to cause the peculiar phenomenon that the tunnel current flows through the insulator layer which has a thickness of 50 nm or greater. As shown in FIG. 10, while $SiO_2$ is an insulator by nature, multiple bands with low potentials are caused by the grain structure defects adjacent thereto or impurities in the insulator layer. It is assumed that electrons tunnel-pass through the low-potential bands one after another, and thus pass through the insulator layer of 50 nm or greater in thickness as a consequence.

Moreover, fluctuation of the emission current Ie of the embodiment electron emission device is measured under the conditions of a 70 V driving voltage Vd and a 200 V accelerating voltage Vc.

Figure 7:
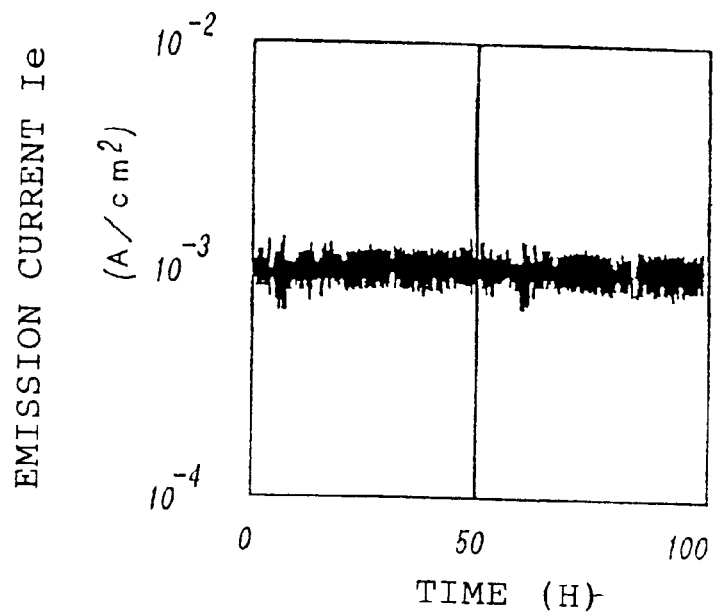
FIG. 7 is a graph illustrating a fluctuation of emission current with the lapse of time in the electron emission device embodying the invention.

FIG. 7 shows the fluctuation of emission current with the lapse of time in the electron emission device. As apparent from FIG. 7, the fluctuations of the emission current Ie of the embodiment device is very small and stable.

It is assumed that this phenomenon occurs due to the oxidation of the electron supply layer to form the insulator layer since it is capable of facilitating to pass many elections from the electron supply layer to the insulator layer through the interface therebetween which is smoothly formed.

In addition, change of the emission current Ie of the embodiment electron emission device is also measured under the conditions of a 70 V driving voltage Vd and a 200 V accelerating voltage Vc.

Figure 8:
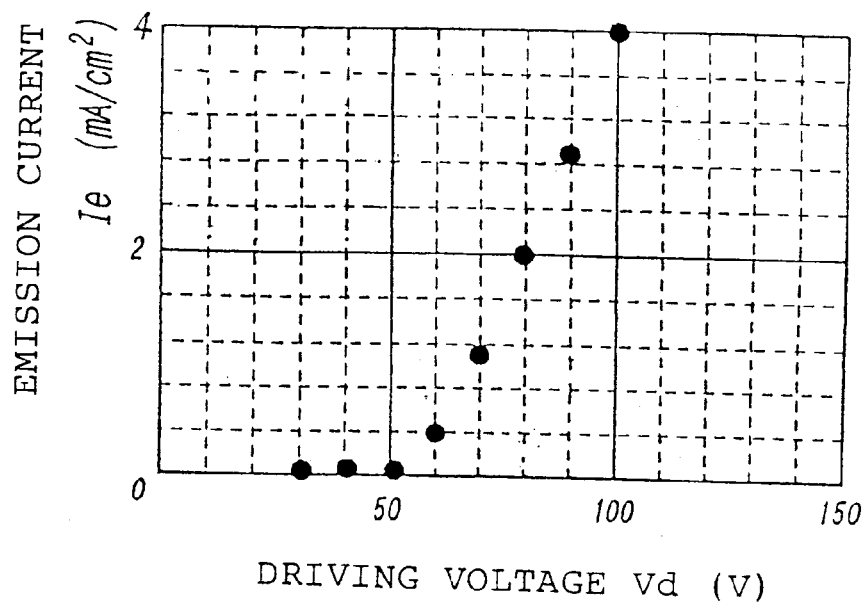
FIG. 8 is a graph illustrating a relationship between the electron emission current and the driving voltage applied for driving the electron emission device of an embodiment according to the invention together with that of a comparative electron emission device.

FIG. 8 shows a relationship between the electron emission current and the driving voltage applied for driving the electron emission device. As seen from plots in FIG. 8, the electron emission devices began to emit electrons at a driving voltage Vd of about 50 V.

Thus, it can be considered that electrons easily pass through the interface between the insulator layer and the electron supply layer, so as to reach stably the thin-film metal electrode.

Figure 9:
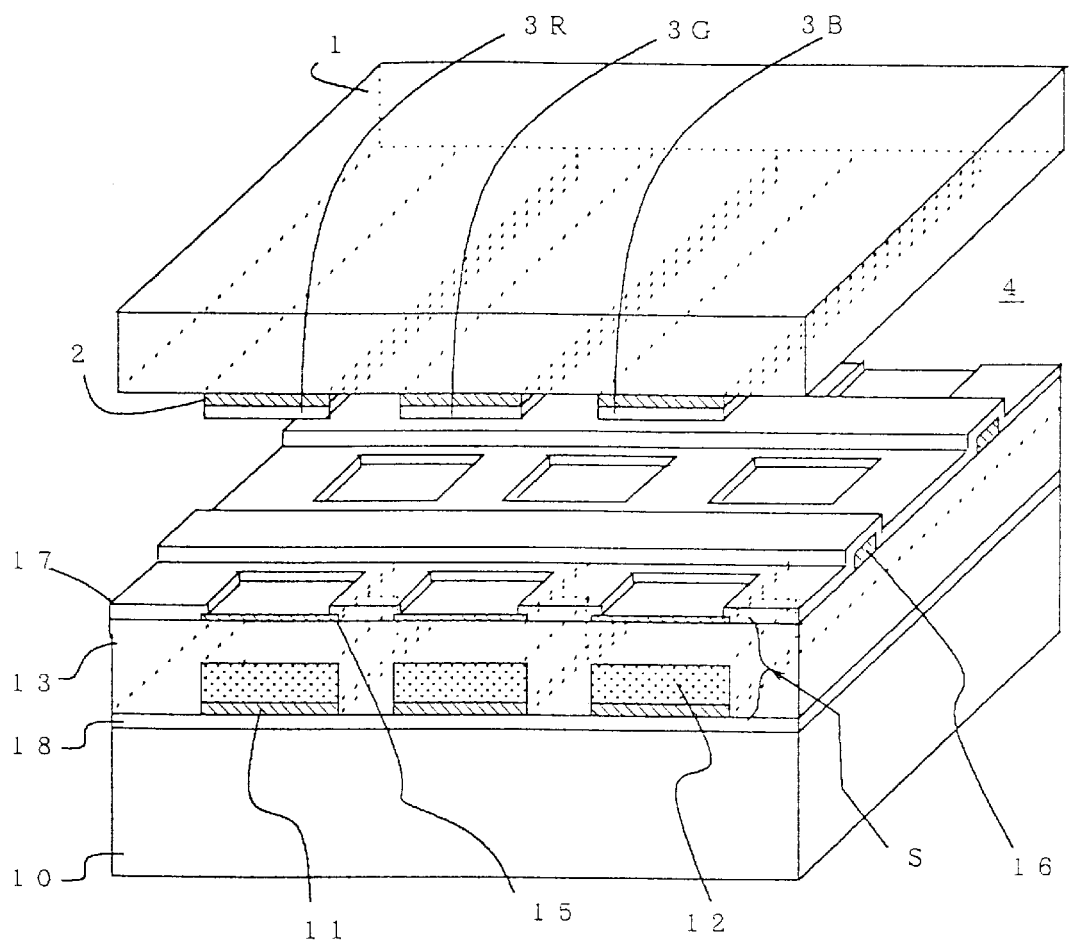
FIG. 9 is a schematic perspective view showing an electron emission display device according to one embodiment of the invention.

FIG. 9 shows an electron emission display device according to one embodiment of the invention. This embodiment comprises a pair of the transparent substrate 1 and the device substrate 10, which face each other with a vacuum space 4 in between. In the illustrated electron emission display apparatus, a plurality of transparent collector electrodes 2 of, for example, an indium tin oxide (so-called ITO), tin oxide (SnO), zinc oxide (ZnO) or the like, are formed in parallel on the inner surface of the transparent glass substrate 1 or the display surface (which faces the back substrate 10). The collector electrodes 2 may be formed integrally. The transparent collector electrodes which trap emitted electrons are arranged in groups of three in association with red (R), green (G) and blue (B) color signals in order to provide a color display panel, and voltages are applied to those three collector electrodes respectively. Therefore, fluorescent layers 3R, 3G and 3B of fluorescent substances corresponding to R, G and B color emissions are respectively formed on the three collector electrodes 2 in such a way as to face the vacuum space 4.

A plurality of ohmic electrodes 11 are formed in parallel on the inner surface of the device substrate 10 of glass or the like which faces the transparent glass substrate 1 with the vacuum space 4 in between (i. e. ,said inner surface faces the transparent glass substrate 1) via an auxiliary insulator layer 18. The auxiliary insulator layer 18 is comprised of an insulator such as $SiO_2$, $SiN_x$, $Al_2O_3$ or AlN, and serves to prevent an adverse influence of the device substrate 10 on the device (such as elution of an impurity such as an alkaline component or a roughened substrate surface). A plurality of electron emission devices are formed on the ohmic electrodes 11. In order to adjoining thin-film metal electrodes 15 are electrically connected to each other, a plurality of bus electrodes 16 are formed on parts of the thin-film metal electrodes 15, extending in parallel to one another and perpendicular to the ohmic electrodes 11. Each electron emission device S comprises the electron supply layer 12, the insulator layer 13 and the thin-film metal electrode 15 which are formed in order on the associated ohmic electrode 11.

The thin-film metal electrodes 15 face the vacuum space 4. A second auxiliary insulator layer 17 with openings is formed to separate the surfaces of the thin-film metal electrodes 15 into a plurality of electron emission regions. This second auxiliary insulator layer 17 covers the bus electrodes 16 to prevent unnecessary short-circuiting.

The material for the ohmic electrodes 11 is Au, Pt, Al, W or the like which is generally used for the wires of an IC, and has a uniform thickness for supplying substantially the same current to the individual devices.

While silicon (Si) is one material for the electron supply layer 12, it is not restrictive for the electron supply layer of the invention and other semiconductors or metals of any of amorphous, polycrystal and monocrystal can be used as well.

From the principle of electron emission, it is better that the material for the thin-film metal electrode 15 has a lower work function ø and is thinner. To increase the electron emission efficiency, the material for the thin-film metal electrode 15 should be a metal of the group I or group II in the periodic table; for example, Mg, Ba, Ca, Cs, Rb, Li, Sr, and the like are effective and alloys of those elements may be used as well. To make the thin-film metal electrode 15 very thin, the material for the thin-film metal electrode 15 should be a chemically stable metal with a high conductivity; for example, single substances of Au, Pt, Lu, Ag and Cu or alloys thereof are desirable. It is effective to coat or dope a metal with a low work function as described above on or in those metals.

The material for the bus electrodes 16 can be Au, Pt, Al or the like which is generally used for the wiring of an integrated circuit IC, and should have a thickness enough to supply substantially the same potential to the individual devices, adequately of 0.1 to 50 $\mu$m.

A simple matrix system or an active matrix system may be employed as the driving system for the display device of the invention.

In addition to the dispersed Si, $SiO_x$ in the insulator layer as shown in the above embodiment, the Si or $SiO_x$ region may be formed in the form of plural layers laminated to one another.

What is claimed is:

1. An electron emission device comprising:

an electron supply layer made of metal or semiconductor;

an insulator layer formed on the electron supply layer; and a thin-film metal electrode formed on the insulator layer and facing a vacuum space, characterized in that said insulator layer formed by oxidation or nitriding process of said electron supply layer and having at a film thickness of 50 nm or greater, whereby the electron emission device emits electrons when an electric field is applied between the electron supply layer and the thin-film metal.

2. An electron emission device according to claim 1, wherein said electron supply layer is made of silicon; and said insulator layer made of a substance selected form silicon oxide and silicon nitride.

3. An electron emission display device comprises:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor; an insulator layer formed on the electron supply layer; and a thin-film metal electrode formed on the insulator layer and facing a vacuum space, wherein said insulator layer formed by oxidation or nitriding process to said electron supply layer and having at a film thickness of 50 nm or greater.

4. An electron emission display device according to claim 3, wherein said electron supply layer is made of silicon; and said insulator layer made of a substance selected form silicon oxide and silicon nitride.

* * * * *